(12) United States Patent
Muzumdar

(10) Patent No.: US 7,197,696 B1
(45) Date of Patent: Mar. 27, 2007

(54) SYSTEM, METHOD AND COMPUTER PROGRAM PRODUCT TO POPULATE DATA INTO SPREADSHEETS AND EXECUTE FUNCTIONS AND PROGRAMS WITHIN THE SAME

(76) Inventor: Pavan Vidyadhar Muzumdar, 651 N. Rochester Rd., Clawson, MI (US) 48017

( * ) Notice: Subject to any disclaimer, the term of this patent is extended or adjusted under 35 U.S.C. 154(b) by 102 days.

(21) Appl. No.: 10/250,130

(22) Filed: Jun. 5, 2003

(51) Int. Cl.
*G06N 3/00* (2006.01)
(52) U.S. Cl. .......................................... 715/503; 707/4
(58) Field of Classification Search ................ 715/503, 715/514; 707/5, 3, 4
See application file for complete search history.

(56) References Cited

U.S. PATENT DOCUMENTS

| | | | |
|---|---|---|---|
| 5,033,009 A | 7/1991 | Dubnoff | |
| 5,231,577 A | 7/1993 | Koss | |
| 5,293,615 A * | 3/1994 | Amada | 707/4 |
| 5,437,006 A | 7/1995 | Turski | |
| 5,613,131 A | 3/1997 | Moss et al. | |
| 5,685,001 A | 11/1997 | Capson et al. | |
| 5,893,123 A | 4/1999 | Tuinenga | |
| 6,112,214 A | 8/2000 | Graham et al. | |
| 6,615,207 B1* | 9/2003 | Lawrence | 707/5 |
| 6,631,497 B1* | 10/2003 | Jamshidi et al. | 715/514 |
| 6,701,485 B1* | 3/2004 | Igra et al. | 715/503 |
| 2002/0055954 A1 | 5/2002 | Breuer | |
| 2002/0144174 A1* | 10/2002 | Nwabueze | 714/1 |
| 2003/0110191 A1* | 6/2003 | Handsaker et al. | 707/503 |
| 2003/0135827 A1* | 7/2003 | Kanzler et al. | 715/522 |
| 2004/0034615 A1* | 2/2004 | Thomson et al. | 707/1 |
| 2004/0088650 A1* | 5/2004 | Killen et al. | 715/503 |
| 2004/0103365 A1* | 5/2004 | Cox | 715/503 |
| 2004/0205521 A1* | 10/2004 | Geuss et al. | 715/503 |
| 2005/0144022 A1* | 6/2005 | Evans | 705/1 |
| 2005/0154779 A1* | 7/2005 | Cypher et al. | 709/202 |

OTHER PUBLICATIONS

Crystal Reports, Crystal Reports 9 Templates, Sep. 27, 2002, Crystal Decisions, pp. 1-6.*
ITtoolbox, Reports, 2006, Information Technology Toolbox inc., pp. 1-9.*

* cited by examiner

*Primary Examiner*—Stephen Hong
*Assistant Examiner*—Manglesh M. Patel

(57) ABSTRACT

Method and apparatus to develop and generate spreadsheet reports. A database is used to store information about template spreadsheet files, queries and functions, query definitions and function calls and programs, external data sources, data source definitions, inputs to queries, and outputs generated by queries. A user interface is used to populate the database with all the information required to define and execute a report. A program uses report definition information from the database, makes a copy of the template spreadsheet file to create the spreadsheet report, executes all defined queries, functions or programs in the sequence specified within the report definition against external data sources and stores retrieved data in the locations within the spreadsheet as specified in the report definition. The queries may also be defined so as to update the data in the external data sources.

2 Claims, 4 Drawing Sheets

SYSTEM, METHOD AND COMPUTER PROGRAM PRODUCT TO POPULATE DATA INTO SPREADSHEETS AND EXECUTE FUNCTIONS AND PROGRAMS WITHIN THE SAME

BACKGROUND OF INVENTION

In recent years, electronic spreadsheets have become well known tools for manipulating and presenting information on a computer. A spreadsheet application is a computer program for creating, modifying and displaying spreadsheets. A spreadsheet organizes data in a two-dimensional pattern of rows and columns, although three and higher dimensional electronic spreadsheets can also be used. Each intersection of a row and a column is termed a cell. The spreadsheet can store a data string in each cell. In general, the data string can include a numeric value such as a cost figure, a label such as a column heading, a date, a formula for computing a numeric value based upon numeric values contained in other cells, and/or format information indicating how data is to be displayed. Typically, the spreadsheet program can also store parameters applicable to multiple cells, such as column widths and default formats.

When the spreadsheet program displays a spreadsheet, either on a computer screen or in a printed report, the electronic spreadsheet does not display the data strings contained in each cell. Rather, the electronic spreadsheet interprets the contents of each cell, and displays the results. For example, if a cell contains numeric or label data, then such data is displayed, modified by any format information contained in the cell. Format information may specify the number of decimal places for numeric values, the format for displaying a date value, etc. When a cell contains a formula, the electronic spreadsheet evaluates the formula, and displays the result, again according to whatever format information the cell may contain.

Advances in spreadsheet application technology have resulted in the ability to create internal programs within the spreadsheets called macros. Macros can be simple functions to format data as described above, or they may be programs that may perform sophisticated analysis of data, or perform other tasks such as transfer of data, call external programs etc.

Although the usefulness of spreadsheet applications has been established for a while, a major hindrance in the usability of spreadsheet applications has been the ability of users to enter large amounts of data from multiple data sources for further analysis within the spreadsheet. Furthermore, the process of manually interspersing data processing functions with data retrieval functions is inefficient, difficult, and potentially error-prone.

The invention has the ability to automatically populate data from a plurality of data sources and execute a plurality of functions in the spreadsheet for formatting, data processing, or other purposes without the intervention of the user.

SUMMARY OF INVENTION

The system comprises: 1) A template spreadsheet file, 2) A report definition and execution command program (RDECP), 3) A report definition database (RDD), 4) A report generation and macro execution program (RGMEP). Please refer to FIG. 1.

Components 2, 3, and 4 are used to populate a copy of a previously designed spreadsheet, (Component 1,) with data from a plurality of data sources. The copy of the spreadsheet is hereafter referred to as a report.

Template Spreadsheet File: The template spreadsheet file is created by the user and contains the look and feel of the report. It may also contain any number of additional worksheets in which data may be populated. Embedded in the template spreadsheet files may be macros that can be referenced during the report generation process.

Report Definition and Execution Command Program (RDECP): The RDECP is a user interface that is used to define the following aspects of the report:

1) The inputs required to generate the report

2) The template file to be used in the report

3) The queries that are executed against the external data sources

3a) The parameters of the queries

3b) The execution criteria of the queries

3c) The cell locations in the report where the data retrieved by the queries will be placed 4) The macros to be executed during execution of the report and their arguments 5) The sequence of query and macro execution 6) The specific values for inputs to a report during execution Report Definition Database (RDD): The report definition database is a persistent data store containing among other information, the structure of the report. It is based on a logical data model to store all the information required to define a report and also to enable the execution and generation of any report at any point after the report definition has been suitably created. It contains data required by the RDECP and RGMEP for report definition and execution.

Report Generation and Macro Execution Program (RGMEP): The RGMEP is the component that generates the report. It first makes a copy of the template spreadsheet file and saves it as the working report file. It then looks up the definition of the report from the RDD. The queries and macros as defined in the report are then executed in sequence as specified in the RDD, and output data is populated in the cells of the report spreadsheet as specified by the report definition.

At the end of execution, the report contains the data from the data sources specified for that report by the definition of the report in the RDD in the locations within the spreadsheet as specified by the Report definition The spreadsheet may also contain the results of macro execution as specified in the definition of the report.

The report may contain a presentation sheet that displays data and the output result of macros that references cells in a worksheet containing data retrieved by a query. The result is that a report can contain data from any number of data sources, be automatically formatted, any number of programs be executed within the spreadsheet automatically in a specific sequence, without any user intervention. The product in which this invention is used contains the capability to schedule these reports for automatic execution and delivery over email after generation.

DETAILED DESCRIPTION

The invention is currently developed and marketed under the trademark Maxene Reporter. The Maxene Reporter application software uses the spreadsheet application program available from Microsoft Corporation under the trademark Excel.

Architecture: This embodiment of the invention is created to run on the operating systems made available by Microsoft Corporation under the trademark Windows 2000 and Windows XP. The user interface or RDECP component of the embodiment is created using ASP technology which enables the entire user interface to be "web-enabled", or accessible using a standard Internet browser. For compatibility reasons, the browser against which it is tested is the one offered by Microsoft Corporation under the trade name Internet Explorer. The spreadsheet template file is expected to be a standard Excel spreadsheet file and is uploaded into the system using an upload function in the RDECP.

The RDD is implemented using a relational database made available by Microsoft Corporation under the trade name Access.

The RGMEP is implemented as an independent executable program using a version of the BASIC programming language made available by Microsoft Corporation under the trade name Visual Basic.

Another system component that is used in the creation of reports is an executable called the task scheduler. The task scheduler takes input generated by the RDECP and decides when the RGMEP should be executed in order to create a report.

Description of the report creation process: In this first step the user creates the definition of the report. This involves executing the following steps:

1. Creating a report record. This is done by opening the "Report Maintenance" screen from one of the opening screens in the system in the module called "Report Administration"

2. Associating the template spreadsheet with the report. This is done by uploading the spreadsheet template file into the system and then selecting a drop down box on the user interface to associate the spreadsheet template with the record.

3. Creating records for the input data required by report. The "Report Maintenance" screen enables the user to add and modify report constants and report parameters by using the respective user interface components. A report parameter is a named input defined in the report. A report constant is an input that is stored in a certain cell on the spreadsheet.

4. Creating records for the queries and/or macros in the report. The "Query/Macro Maintenance" screen is used for this action.

5. Creating records for the parameters required by each query or macro. The "Parameter List" area of the "Query/Macro Maintenance" screen is used for this function.

6. Creating records and the location of the output generated by each query. The "Query/Macro Maintenance" screen enables the user to specify the cell locations for the outputs generated by the query.

Figure 3:
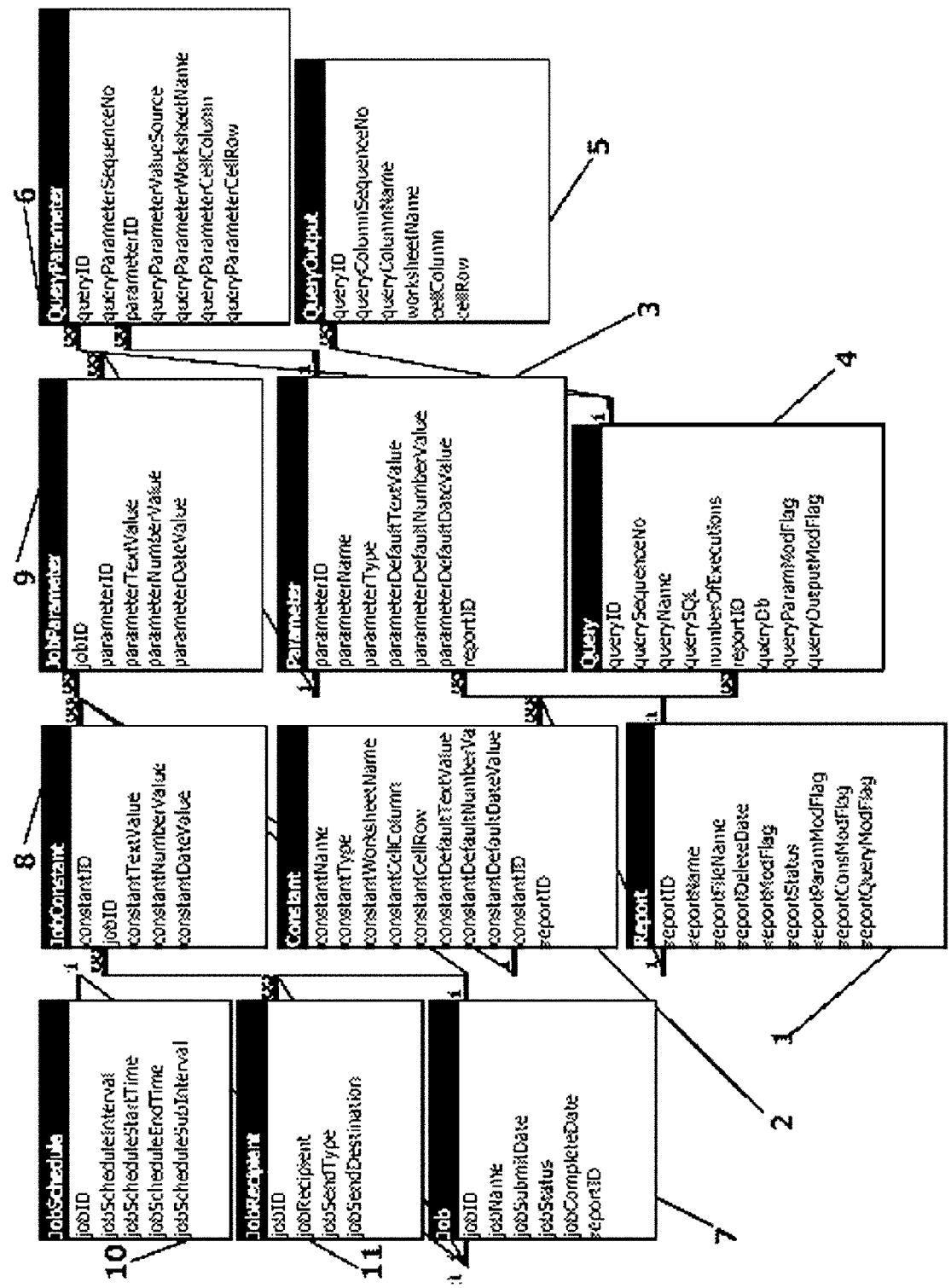
FIG. 3. is the data model of the RDD in the embodiment of the invention
Figure 4:
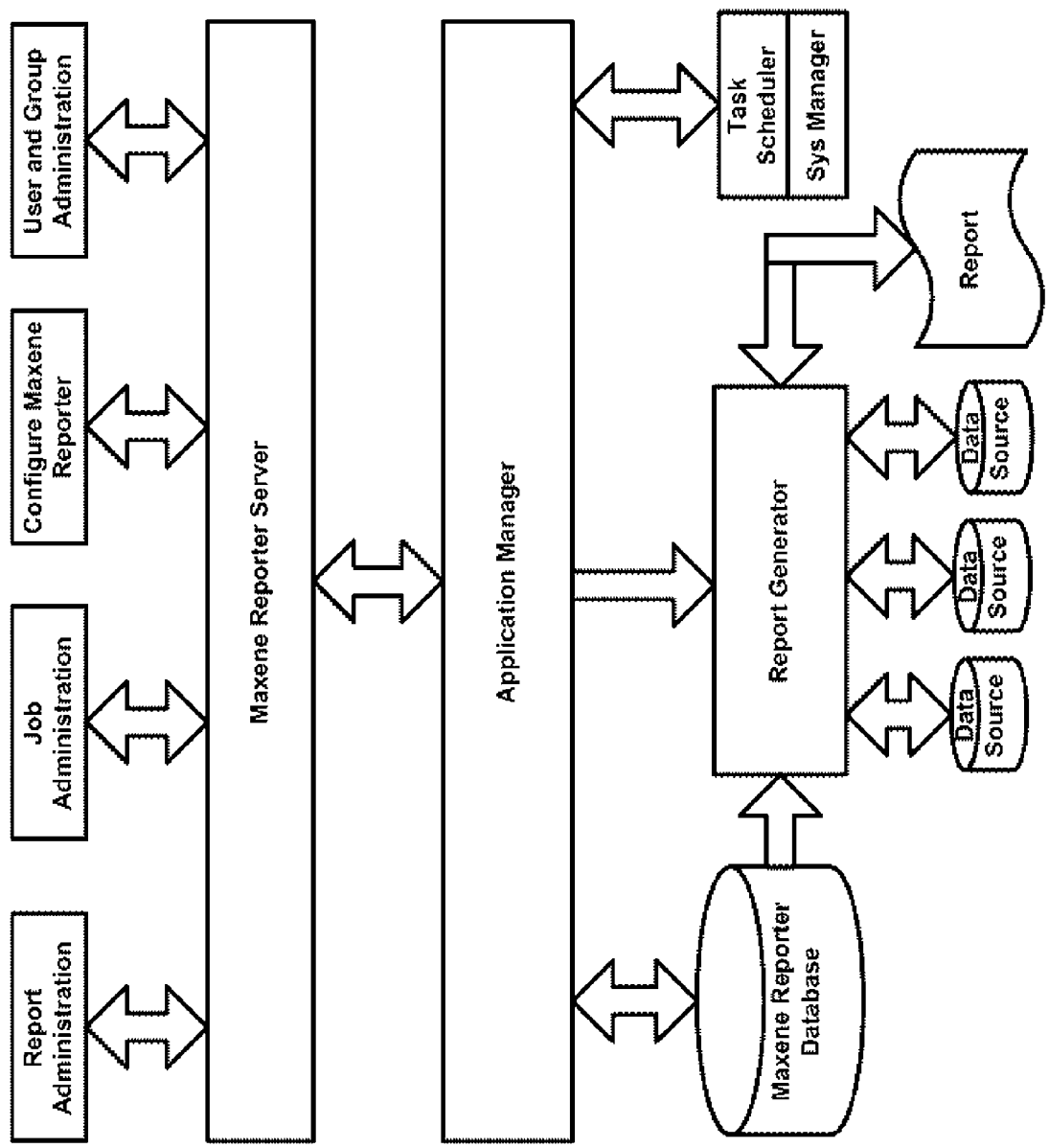
FIG. 4. is the architecture of the embodiment of the invention

Data definition: An important aspect of the invention is the data model that is used to store the information of reports and execution of reports or jobs. Please refer to FIG. 3.

Reports: The main record containing information pertaining to a report such as its name, the name of the spreadsheet template is stored in the table 1 called Report.

Report Inputs: Report inputs are either report parameters or report constants, the information for report parameters and report constants are stored in the tables 2 Constant and 3 Parameter respectively. These tables are dependent on the table Report from a referential integrity standpoint and report parameters and report constants are related to the report using the foreign key reportID from the Report table Queries and Macros: Query and macro definitions are stored in the table 4 Query. A query or macro call is associated with a report by the foreign key reportID from the Report table. The queryName field is used to distinguish between queries and macros. All macro calls must begin with the keyword "MACRO:" exactly as shown. The querySQL field contains the actual query. This may be written in the SQL language, or be a stored procedure call, any command string accepted by the ODBC data source, or the call to the macro within the spreadsheet template. The text in this field may contain embedded "?" characters. These characters identify the parameters to be given to the query or macro during execution as determined by the order of the query parameters explained later. It also contains information on the ODBC data source which is accessed by the query. The order of the query or macro call within the report is controlled by the field sequenceNumber.

A query may be executed once or may be configured to execute a multiple number of times. For multiple executions, at least one of the parameters of the query explained later is required to take its value from a specific cell of the spreadsheet. Parameter values for subsequent executions of the query are taken from subsequent rows in the spreadsheet.

Query Parameters: Information of the parameters given to a query during execution of the report is stored in the table 6 QueryParameter. The QueryParameter table is related to the Query table via the queryID foreign key from the Query table. The queryParameterValueSource field indicates whether the value is provided by a report parameter from the Parameter table, or from a specific cell in the spreadsheet as a single valued parameter or as an iterated parameter for multiple executions of a query.

Query Outputs: Table 5 QueryOutput stores the information about the cell locations of the outputs produced by a query. Each column of data produced by the query is provided a single record in this table with a sequence number for corresponding ordering of the data. The cell location identifies where the particular column in the first row of data will be inserted during the report generation process. Each query can have multiple outputs, depending on the number of columns returned by the query hence each of these records is related back to the Query table with the foreign key queryID.

Job Information: When a job is created in the system, a record is created in table 7 Job to capture the main information of the job such as the report to be executed, and status information. The dependent tables 8 JobConstant and 9 JobParameters are populated with the specific information pertaining to the values to be taken by the report constants and parameters respectively during the execution of the report. The tables 10 JobSchedule and 11 JobRecipients contain scheduling and recipient information respectively for the Job.

Detailed Description of Job Execution Process

Figure 1:
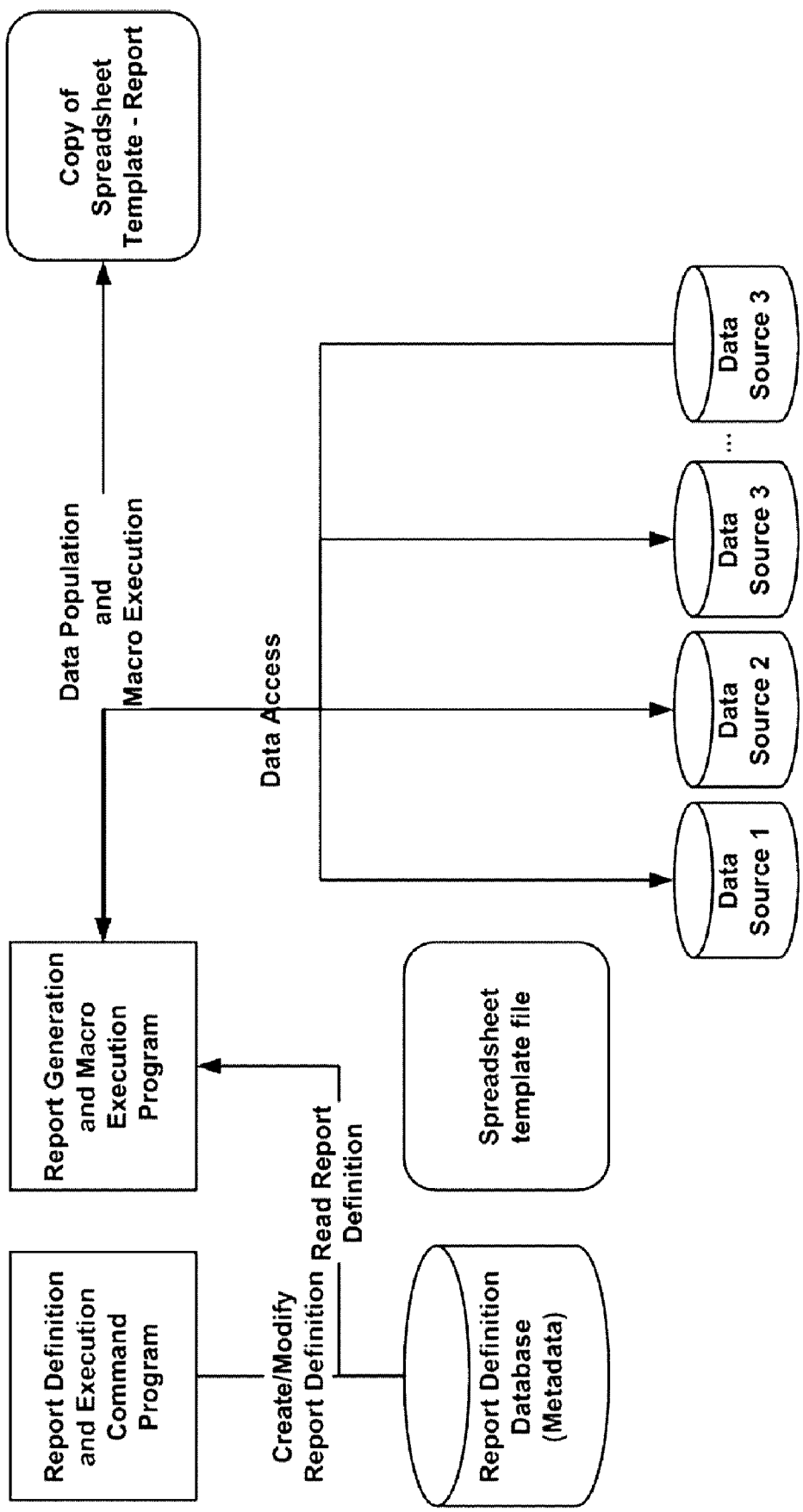
FIG. 1. is a block diagram of the main components of the invention
Figure 2:
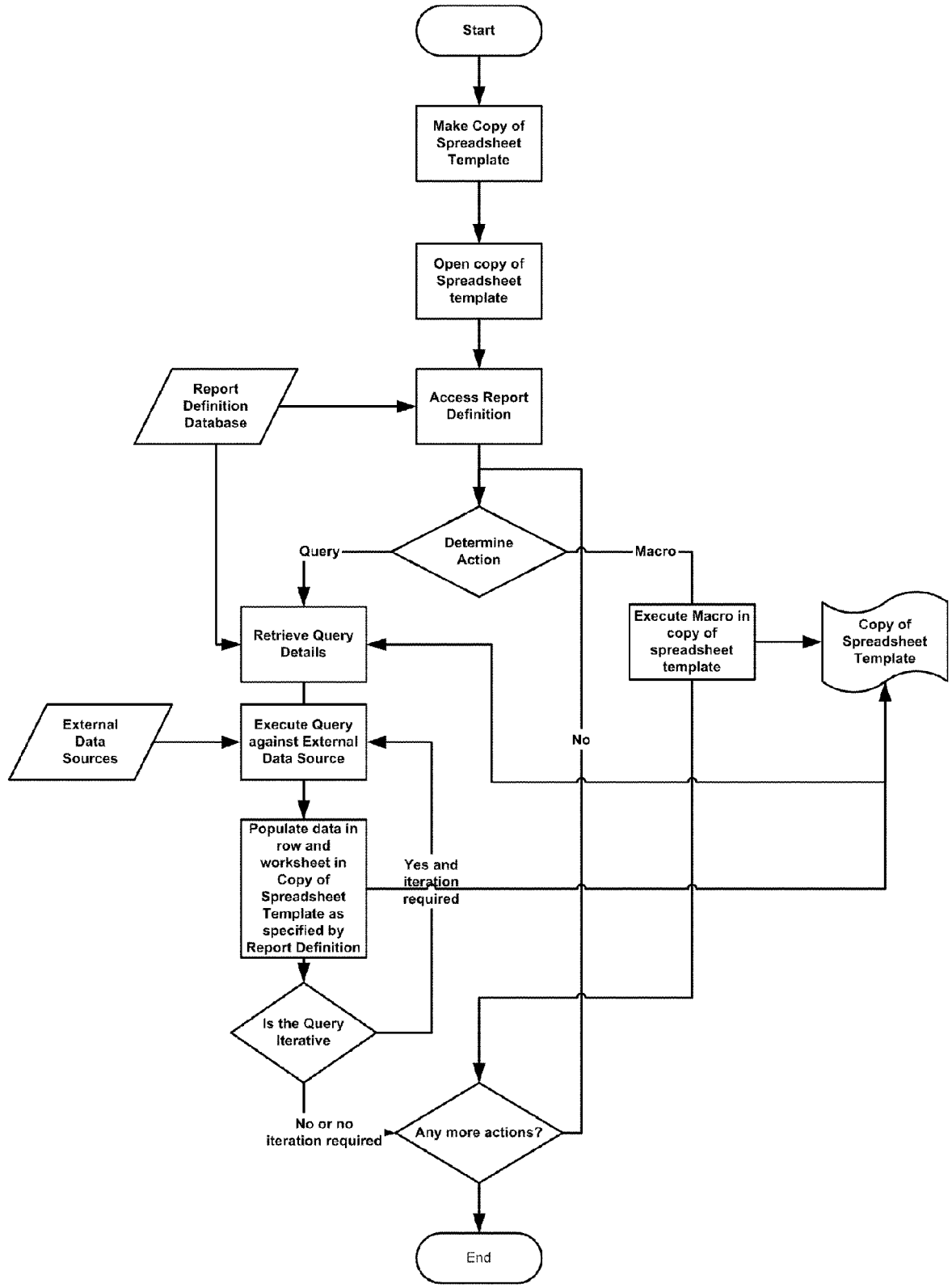
FIG. 2. is a flowchart representing the logic utilized in the RGMEP

After a report is successfully created, the user may use the RDECP to execute a "job". A job is a specific execution of a report with specific values for the inputs named during the report creation process. Please refer to FIG. 2.

The steps in creating a Job are:

1. Naming the job.
2. Identifying the report
3. Specifying the values of the report inputs
4. Specifying the scheduling requirements of the report
5. Specifying the recipient list and the nature of notification for each recipient of the report All the above information is provided to the RDECP using the "Job Maintenance" screen in the system.

Upon creation of the Job record, depending on the scheduling requirements, one of two events occur:

1. The job is set for immediate execution or 2. The job is scheduled for future or periodically scheduled execution During execution the RGMEP makes a copy of the spreadsheet template and then communicates with the copy of the spreadsheet template, the report file using an inter-process communication mechanism made available by Microsoft Corporation under the trade name OLE (Object Linking and Embedding). The RGMEP uses the RDD to determine the specific data sources that should be accessed in the execution of the report. It also takes the query text from the RDD and executes the queries against these data sources providing input to the queries either from the input parameters of the report or cells in the report file. Similarly macro definitions in the RDD are used to call macros in the report file using inputs as described for the queries above. Queries may be executed a multiple number of times depending upon the information stored in the RDD. After all queries and macros are executed in the order in which they are specified to execute in the RDD, the report generation logic is considered completed. Upon completion of the report generation logic, the report file is saved in a folder and is then emailed to the recipients in the format specified in the JobRecipient table.

What is claimed is:

1. Computer implemented method to access data from a plurality of data sources and to populate said data into spreadsheets, and execute functions and programs in the same comprising:

a) Providing a template spreadsheet file of which a copy is made called the report file prior to commencing the population of data, executing data retrieval and processing functions, which will:

I) Contain all pertinent worksheets and cells for population of data;

II) Contain definitions to all functions called; and

III) Contain information for formatting the data;

b) Providing a data base which:

I) Stores a pointer to said template spreadsheet file;

II) Stores information pertaining to input data used to filter data accessed from said data sources;

III) Stores information pertaining to queries used in the access and capture of said data and the location of said data in said report file; and IV) Wherein said queries stored in said database modify data in said data sources;

V) Stores references to said functions and sequence of execution of said functions;

VI) Wherein said database contains information that causes said program to execute multiple queries and programs a multiple number of times using input data from multiple cells of said report file by traversing said report file across rows and columns;

c) Providing a program which creates said report file, accesses said database and retrieves said data from said data sources and executes functions in the sequences stored in said database; and d) Providing a human interface for a user:

I) Wherein the user populates information stored in said database;

II) Wherein said human interface causes users to execute said functions in a pre-determined schedule.

2. Method of claim 1 wherein said input data is in one or more cells of said report file.

* * * * *